US009696152B2

(12) United States Patent
Tomita et al.

(10) Patent No.: US 9,696,152 B2
(45) Date of Patent: Jul. 4, 2017

(54) POSITION MEASURING APPARATUS (71) Applicant: TOYOTA JIDOSHA KABUSHIKI KAISHA, Toyota-shi (JP)

(72) Inventors: Yukiharu Tomita, Toyota (JP); Kenzo Yamanouchi, Toyota (JP); Ryosuke Oikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/290,317

(22) Filed: Oct. 11, 2016

(65) Prior Publication Data
US 2017/0138727 A1    May 18, 2017

(30) Foreign Application Priority Data
Nov. 18, 2015    (JP) .................................. 2015-225980

(51) Int. Cl.
| | |
|---|---|
| *H02K 5/16* | (2006.01) |
| *G01B 21/16* | (2006.01) |
| *G01L 3/02* | (2006.01) |

(52) U.S. Cl.
CPC ................ *G01B 21/16* (2013.01); *G01L 3/02* (2013.01)

(58) Field of Classification Search
USPC ................ 310/90; 74/425; 700/73
See application file for complete search history.

(56) References Cited

U.S. PATENT DOCUMENTS

| | | | | | |
|---|---|---|---|---|---|
| 4,083,286 | A | * | 4/1978 | Faulkner ................... | G10H 7/00 84/647 |
| 4,409,505 | A | * | 10/1983 | Petersen ................. | H02K 13/10 310/228 |
| 5,079,465 | A | * | 1/1992 | Schmidt ................... | F02N 11/00 310/90 |

(Continued)

FOREIGN PATENT DOCUMENTS

| | | |
|---|---|---|
| JP | 7-11841 | 3/1995 |
| JP | 11-123637 | 5/1999 |

(Continued)

*Primary Examiner* — Jewel V Thompson
(74) *Attorney, Agent, or Firm* — Oblon, McClelland, Maier & Neustadt, L.L.P.

(57) ABSTRACT

It is possible to, with a position measuring apparatus in a NC machine tool, a NC lathe, or the like that uses a load monitoring scheme, significantly reduce a response delay on the detecting jig side than those in the conventional apparatuses, and consequently measure the position of a measurement target with high accuracy. A measurement target (e.g., an advanceable and retractable center) is caused to abut a position detecting jig at the advanced end of the measurement target. In such a state, retracting and advancing motions of the measurement target are created to increase the load torque of a feed motor to a level sufficiently higher than the load torque that is detectable by the apparatus. After that, the abutment state between the measurement target (center) and the jig is canceled to cause a sudden drop in the load torque of the feed motor. Accordingly, it is possible to, even with a position measuring apparatus that uses a relatively low-cost load monitoring scheme, significantly reduce a response delay than those in the conventional apparatuses, and consequently measure a position with higher accuracy.

4 Claims, 4 Drawing Sheets

(56) References Cited

U.S. PATENT DOCUMENTS

| | | | | |
|---|---|---|---|---|
| 7,093,502 B2* | 8/2006 | Kupnik | ............... | G01F 1/662 73/861.27 |
| 7,775,125 B2* | 8/2010 | Rhodes | ............... | G01F 1/66 73/861.27 |
| 2014/0379117 A1 | 12/2014 | Nishimura | | |
| 2015/0045806 A1* | 2/2015 | Urich | ............... | A61F 9/00745 606/107 |
| 2016/0334252 A1* | 11/2016 | Kashima | ............... | G01F 1/662 |

FOREIGN PATENT DOCUMENTS

| | | |
|---|---|---|
| JP | 2002-175104 | 6/2002 |
| JP | 2009-45711 | 3/2009 |
| JP | 2009-45711 A | 3/2009 |
| JP | 2015-3375 | 1/2015 |

\* cited by examiner

POSITION MEASURING APPARATUS

CLAIM OF PRIORITY

The present application claims priority from Japanese patent application JP 2015-225980 filed on Nov. 18, 2015, the content of which is hereby incorporated by reference into this application.

BACKGROUND

Technical Field

The present invention relates to a position measuring apparatus. In particular, the present invention relates to a position measuring apparatus suitable for measuring the position of a workpiece, which is a measurement target, with high accuracy in a numerically controlled (NC) machine tool and the like.

Background Art

In a machine tool apparatus such as a NC machine tool or a NC lathe, it is necessary to accurately measure the position of a jig or a measurement target, which is a center, in the apparatus. Typically, such an apparatus has a measurement target as well as a main spindle or a turret that has attached thereto a stylus to touch the target. The apparatus also has a means for monitoring the load (load torque) of a feed motor for the main spindle or the turret. Such a load monitoring means is adapted to detect fluctuations (increase) in the load torque at a moment when the stylus touched the target and capture the position information on the stylus at that moment as the position information on the measurement target. Such a scheme is typically called a load monitoring scheme, and an example thereof is disclosed in Patent Document 1, for example. Herein, when the value of current (load) of a feed motor exceeds a predetermined value, it is basically determined that a moving body (stylus) touched a stationary object (measurement target), and thus, position information at that time is recorded.

RELATED ART DOCUMENTS

Patent Documents

Patent Document 1: JP H07-11841 Y2

SUMMARY

Figure 3:
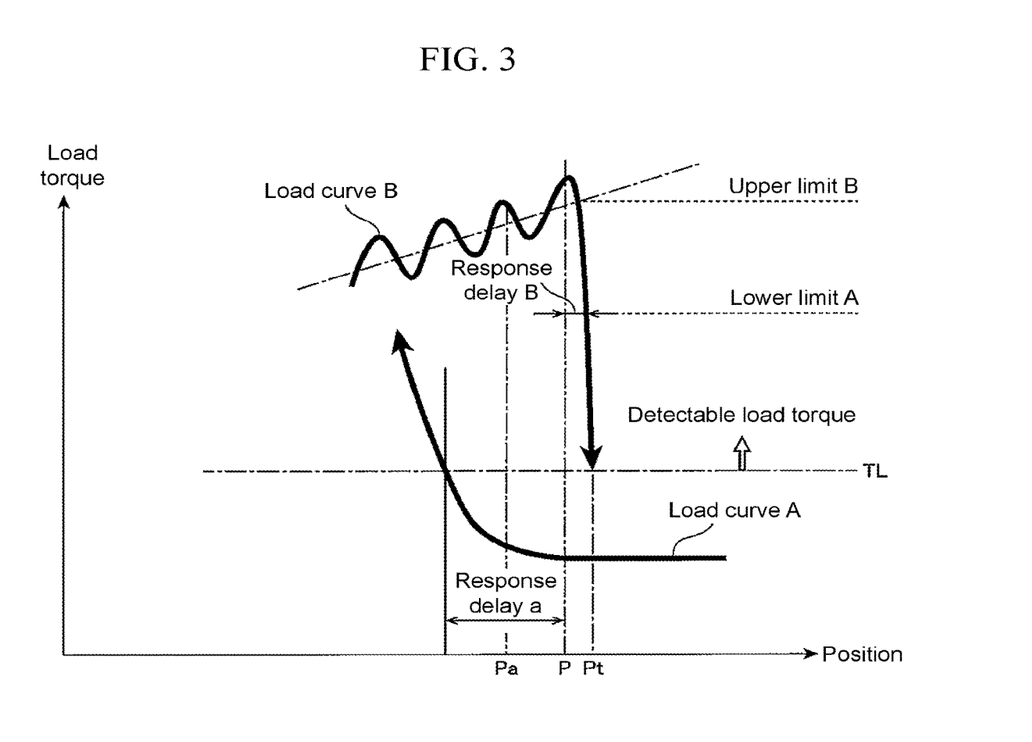
FIG. 3 is a graph showing the position of a measurement target and fluctuations in the load of a feed motor that feeds a position detecting jig; specifically, a load curve A is a graph when the conventional load monitoring scheme is used, and a load curve B is a graph when the position measuring apparatus in accordance with the present invention is used.

In the aforementioned load monitoring scheme, a configuration in which fluctuations in the load at a moment when a stylus touched a measurement target are detected would be insufficient to measure position information with high accuracy because, as shown in a load curve A of FIG. 3, a response delay a inevitably occurs due to the high feed rate of the stylus, deflection errors of the stylus, and the like. That is, in FIG. 3, provided that a point P is the correct position of the measurement target (e.g., the foremost advanced position of an advanceable and retractable center), the detected load curve A curve slopes upwards from right to left as shown in FIG. 3. The load torque detected at the beginning of the contact is at a level lower than the load torque level (threshold) TL that is detectable by the apparatus, and after a predetermined time has elapsed, the load torque reaches a level above the detectable load torque level (threshold) TL. The passage of the predetermined time herein corresponds to the response delay a, which is a cause of the inaccuracy of the position information. The currently available load monitoring scheme typically has a measurement accuracy (measurement errors) of about 100 to 200 μm due to such a response delay.

When a mechanism for electrically providing information on the contact timing, like a touch probe, is used, it is possible to achieve an accuracy of about 10 μm. However, as an apparatus with a touch probe is expensive, an increase in the total cost of the entire apparatus is unavoidable. Further, although the measurement accuracy can be improved even when the load monitoring scheme is used, by controlling a stylus such that it slowly and gradually touches a measurement target in a sufficient time, such a scheme cannot be recognized as a scheme that can be sufficiently put into practical use because the influence of the inertial mass of the stylus that acts along the movement direction of the stylus cannot be ignored and the measurement time or the machine cycle time inevitably becomes long.

The present invention has been made in view of the foregoing circumstances. It is an object of the present invention to disclose a position measuring apparatus that can measure a position with an accuracy of about 50 μm, for example, and with a small response delay a by adopting the aforementioned low-cost, user-friendly load monitoring scheme without adopting a high-cost touch probe scheme.

A position measuring apparatus in accordance with the present invention is a position measuring apparatus including at least an abutment unit that causes a position detecting jig fed by a feed motor to abut a measurement target; a detecting unit that detects the position of the measurement target by reading a fluctuation in the load torque of the feed motor; a load increasing unit capable of increasing the toad torque of the feed motor to a predetermined first value in a state in which the position detecting jig abuts the measurement target, the first value being above a threshold that is detectable by the apparatus; a canceling unit that, when the load torque of the feed motor has become greater than or equal to the first value, cancels the abutment state between the measurement target and the position detecting jig to thereby cause a sudden drop in the load torque of the feed motor; a monitoring unit that monitors if the dropped value of the load torque has become less than a predetermined second value, the second value being less than the first value and greater than the threshold; and a capturing unit that captures position information on the position detecting jig as the position of the measurement target when the monitoring unit detects that the load torque of the feed motor has become less than the second value.

According to the present invention, after the load torque of the feed motor is once increased to a level sufficiently higher than the threshold that is detectable by the apparatus, the abutment state between the measurement target and the position detecting jig is canceled to cause a sudden drop in the load torque of the feed motor, whereby it is possible to, even with a position measuring apparatus with a position detecting unit that uses a load monitoring scheme, significantly reduce a response delay than those in the conventional apparatuses, and consequently measure a position with higher accuracy.

According to an embodiment of the position measuring apparatus of the present invention, the measurement target is an advanceable and retractable measurement target, the position information to be measured is the advanced end position of the measurement target, and the load increasing unit includes a balancing unit that keeps a balance between pressures on the measurement target and the position detecting jig that are opposite each other in the abutment state, a first movement unit that slightly moves the measurement target and the position detecting jig in a balanced state in a direction to retract the measurement target, and a pressure applying unit that applies pressure to a side of the measurement target toward the position detecting jig after both the measurement target and the position detecting jig have been slightly moved.

According to such an embodiment, the push-back amount of the first movement unit that slightly moves the measurement target and the position detecting jig in the balanced state in the direction to retract the measurement target is 0 to −100 μm from the initial reference position, and the distance between the measurement target and the position detecting jig that is secured to cancel the abutment state therebetween when the load torque of the feed motor has become greater than or equal to the first value is less than or equal to 50 μm, preferably, less than or equal to 10 μm. It should be noted that when the apparatus is actually operated, the distance between the measurement target and the position detecting jig obtained by moving the position detecting jig away from the measurement target can be efficiently determined using a method of reducing the distance in stages taking errors in consideration, such that 50 μm→40 μm→20 μm→10 μm, and the final distance is desirably less than or equal to 10 μm.

According to another embodiment of the position measuring apparatus of the present invention, the measurement target is a fixed measurement target, the position information to be measured is a fixed position of the measurement target, the position detecting jig further includes a spring member, and the load increasing unit includes a second movement unit that moves the position detecting jig toward the fixed measurement target until the spring member acts as a spring.

In the present invention, the phrase "advanceable and retractable" means that, provided that the movement directions of the measurement target and the position detecting jig are the Z-axis direction, the measurement target can be advanced and retracted along the Z-axis.

According to the present invention, it is possible to, even with a position measuring apparatus in a NC machine tool, a NC lathe, or the like that uses a load monitoring scheme, significantly reduce a response delay than those in the conventional apparatuses, and consequently measure a position with higher accuracy.

DETAILED DESCRIPTION

Hereinafter, an embodiment of a position measuring apparatus in accordance with the present invention will be described with reference to the accompanying drawings. It should be noted that the position measuring apparatus in accordance with the present invention can be applied to equipment in general that has a configuration in which a jig, which is attached to the main spindle of a NC machine tool, the turret of a NC lathe, or the like, and a measurement target can keep a balance therebetween by being pressed against each other, and the measurement target can stop at a predetermined target position (e.g., advanced position). Although an example will be described hereinafter in which the measurement target is an advanceable and retractable center supporting a workpiece (not shown) on a NC lathe, the position measuring apparatus in accordance with the present invention is not limited thereto.

Figure 1:
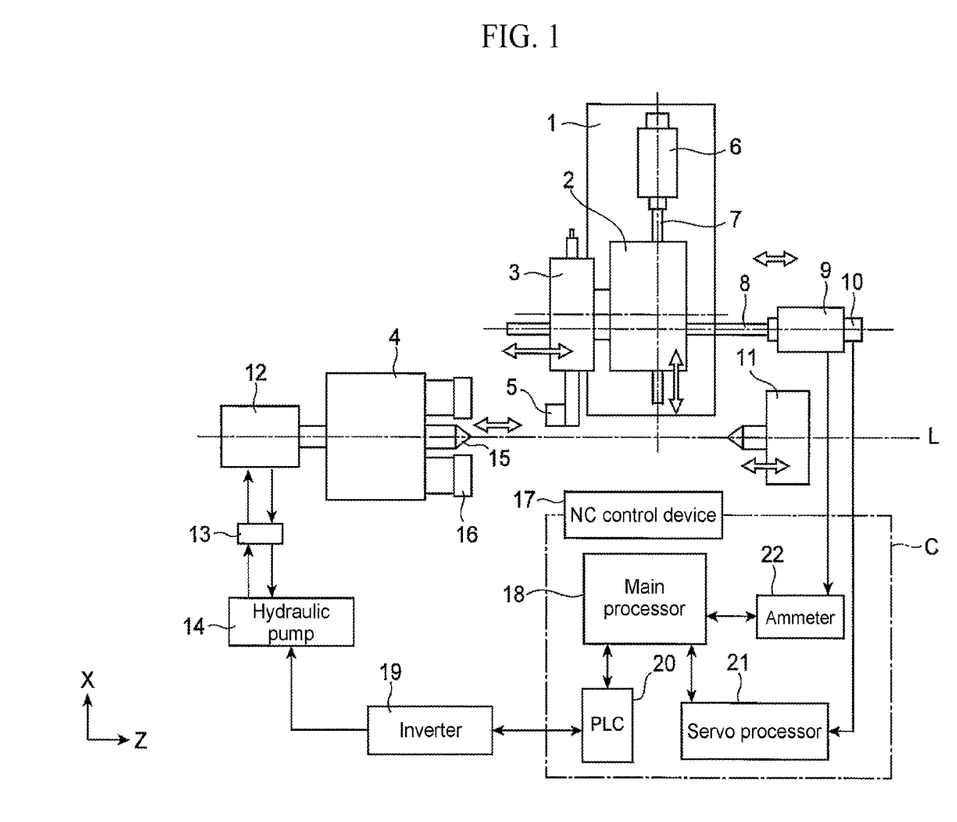
FIG. 1 is a block diagram showing an embodiment of a position measuring apparatus in accordance with the present invention.

In FIG. 1, reference numeral 1 denotes a sliding table of a position measuring apparatus, and a toolpost 2 and a turret 3 are arranged on the sliding table 1. Reference numeral 4 denotes a main spindle table, and an advanceable and retractable center 15, which is a measurement target, is attached to the main spindle table 4 such that it can be advanced and retracted. The turret 3 has a pressing jig 5 for detecting the center (hereinafter simply referred to as a "jig 5") attached thereto such that the jig 5 can be placed opposite the advanceable and retractable center 15. The toolpost 2 has attached thereto an X-axis feed (in-feed) motor 6 and an X-axis ball screw 7 that is drive-connected to the X-axis feed motor 6. The rotation of the X-axis feed motor 6 is transmitted to the toolpost 2 via the X-axis ball screw 7, and the toolpost 2 moves in the X-axis direction.

The toolpost 2 has attached thereto a Z-axis ball screw 8 and a Z-axis feed motor 9 that provides rotation to the Z-axis ball screw 8. The Z-axis ball screw 8 is drive-connected to the turret 3. Reference numeral 10 denotes a pulse encoder that is attached to the Z-axis feed motor 9, and reference numeral 11 denotes a tailstock provided at a position opposite the main spindle table 4.

The main spindle table 4 has a hydraulic cylinder 12, and a hydraulic fluid from a hydraulic pump 14 is sent to the hydraulic cylinder 12 via a hydraulic switching valve 13. On the main spindle table 4, the aforementioned advanceable and retractable center 15 is disposed such that it is opposite the tailstock 11 and also such that the axial center line L, which is common to the advanceable and retractable center 15 and the tailstock 11, is parallel with the axial center line of the Z-axis ball screw 8. The advanceable and retractable center 15 advances and retracts in the Z-axis direction upon actuated by the hydraulic cylinder 12. Reference numeral 16 denotes a chuck provided around the advanceable and retractable center 15.

The position measuring apparatus includes a control unit C. The control unit C includes a NC control device 17, a main processor 18, an inverter 19, a PLC (programmable controller) 20, a servo processor 21, and an ammeter 22. The details of the control unit C will be described with reference to the following description of the operation.

Figure 2:
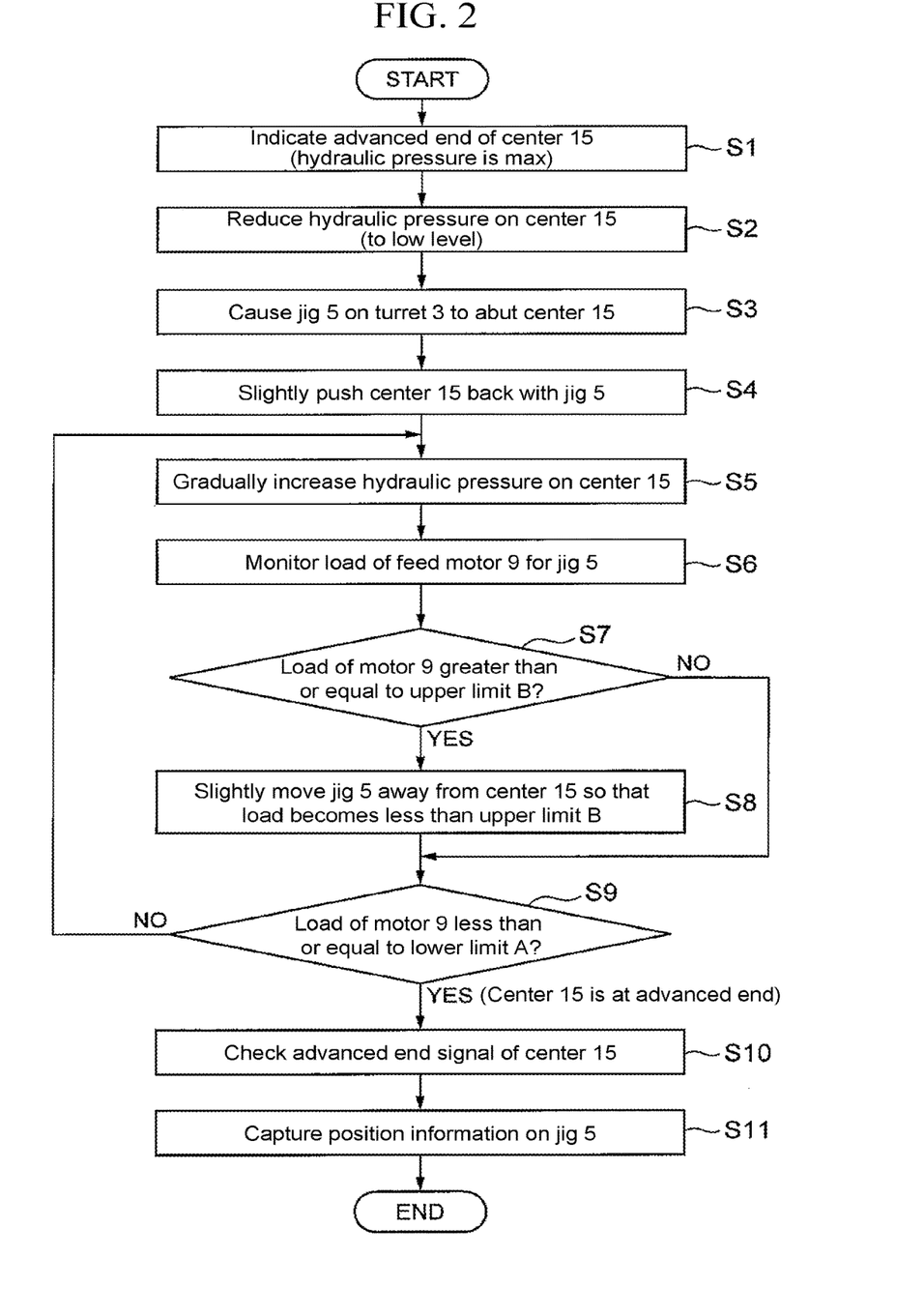
FIG. 2 is a flowchart illustrating the operation.

The operation of the aforementioned position measuring apparatus will be described with reference to a flowchart in FIG. 2. First, the advanced end of the center 15 is indicated in S1. For example, by the "indication of the advanced end of the center 15" in S1, the center 15 is advanced until it abuts an appropriate dead stopper (not shown in FIG. 1). When the position information at that time is captured using a proximity switch, the position accuracy would typically deviate from a target value by about ±0.5 mm, and even a positional deviation may occur due to lubrication failures of the advanceable and retractable center 15. The position measuring apparatus in accordance with the present invention can acquire correct position information with a small response delay in such a case.

In S1, the hydraulic pressure of the hydraulic cylinder 12 is preferably MAX. In an apparatus such as a common NC lathe, the force that presses the center 15 to the advanced end position is as high as greater than or equal to 5 kN, while the force (feed force) that presses the jig 5 (and the turret 3 and the toolpost 2) is about 0.3 kN. Thus, the force that presses the center 15 to the advanced end position is far greater than the force that presses the jig 5. In the apparatus according to the present invention, it is necessary to keep a balance between such two pressing forces. Therefore, after the center 15 is once moved to the advanced end position in S1, the hydraulic pump 14 is controlled from the PLC 20 via the inverter 19 to reduce the pressure (to set the hydraulic pressure to LOW) in S2 so that the two pressing forces from opposite sides are balanced.

Next, in S3, the Z-axis feed motor 9 is actuated to drive the Z-axis ball screw 8, and the jig 5 on the turret 3 is moved in the Z-axis direction so as to abut the center 15 located at the advanced end position. It should be noted that when the center 15 abuts a dead stopper, the hydraulic pressure that acts on the center 15 may be zero. In that case, no load is applied to the Z-axis feed motor 9 when the center 15 abuts the dead stopper.

Next, in S4, the Z-axis ball screw 8 is further driven to cause the center 15 and the jig 5, which abut each other, to be slightly pushed back leftwards in the drawing. It should be noted that in an apparatus such as a NC lathe of this type in which a measurement target can be clearly stopped at a given position, it is common that the advanced end position of the center 15 is initially adjusted to be within the range of about 0 to 50 μm from a target position. Therefore, the jig 5 is fast-fed toward the center 15 to a position of about +300 μm from the reference position, taking adjustment errors into consideration, and then, the feed rate is slowed down to cause the jig 5 to abut the center 15. Accordingly, the machine cycle time can be reduced. The push-back amount in S4 may be about 0 to −100 μm from the reference position (the advanced end position of the center 15). It should be noted that herein, symbol + represents the rightward direction, while symbol − represents the leftward direction (i.e., the direction in which the center 15 and the jig 5 are pushed back).

After the center 15 is retracted with the jig 5 in one direction by a small distance, the hydraulic pump 14 is controlled from the PLC 20 via the inverter 19 to raise the hydraulic pressure that acts on the center 15 (increase the pressure) preferably gradually. Accordingly, the load torque of the Z-axis feed motor 9 that drives the Z-axis ball screw 8, which is drive-connected to the jig 5, gradually increases. It should be noted that the step of S5 may be omitted if a given level of hydraulic pressure already acts on the center 15 side at a stage where the center 15 and the jig 5 have been pushed back in one direction by a small distance.

In S6, the control unit C monitors the load of the motor for pressing the jig 5 (Z-axis feed motor 9). Specifically, the load torque (the amount of current) of the Z-axis feed motor 9 is monitored with the main processor 18 via the ammeter 22. In S7, the control unit C determines if the load of the Z-axis feed motor 9 is greater than or equal to a predetermined first value (a value indicated as an "upper limit B" in FIG. 3) that is greater than the minimum detectable load torque (threshold) TL detectable by the present position measuring apparatus by a predetermined amount.

It should be noted that the "load" herein is the pressure applied to the jig 5 by the Z-axis feed motor 9 via the Z-axis ball screw 8, and a value that is obtained by multiplying the destruction limit pressure in the equipment configuration of the present position measuring apparatus by a predetermined factor of safety is set as the first value B. How large the factor of safety should be set is determined from an empirical rule and thus is a design matter. However, if the two components are balanced with larger pressure, a drop in the load of the Z-axis feed motor 9 at the advanced end of the center 15 can be increased as described below, which is advantageous in that the position determination becomes easier.

Next, in S7, if the main processor 18 determines that the load of the Z-axis feed motor 9 is greater than or equal to the first value B, the main processor 18 moves the jig 5 slightly away from the center 15 to keep a necessary distance therebetween in S8. Accordingly, the load of the Z-axis feed motor 9 rapidly decreases. It should be noted that the operation of slightly moving the jig 5 away from the center 15 is performed by actuating the Z-axis feed motor 9 while keeping a balance the center 15 and the jig 5. How small the jig 5 should be moved away from the center 15 can be efficiently determined using a method of reducing the distance in stages taking errors into consideration as described above, that is, gradually reducing the distance each time measurement is actually performed to determine an optimal value. The final distance is desirably about 10 μm or less than that. Needless to say, it is also possible to use a fixed given value from the beginning, taking into consideration the relationship with the hydraulic control.

Next, in S9, the control unit C determines if the load of the Z-axis feed motor 9 has become less than or equal to a second value A that is shown as a lower limit A in FIG. 3. Herein, the second value A is a value appropriately selected from among values above the minimum load torque value (threshold) TL that is detectable by the control unit C in the apparatus. At a moment when the jig 5 is moved away from the center 15 in S8 after the center 15 has reached the advanced end as described above, a sudden drop in the load occurs at that moment. Thus, in S9, it is determined if the load torque has become less than or equal to the second value A upon occurrence of such sudden drop in the load.

Referring to FIG. 3, a specific example of fluctuations in the load of the Z-axis feed motor 9 in S4 to S9 will be described. In FIG. 3, the load curve B indicates fluctuations in the load of the Z-axis feed motor 9 in the present position measuring apparatus. The position Pa is the position where the center 15 has been slightly pushed back by the jig 5 in S4, and the aforementioned advanced position P-Pa is about 0 to −100 μm. The value of the load torque at this time is greater than the minimum detectable load torque value TL that is a threshold because the two components retract while being pressed against each other. When the hydraulic pressure on the center 15 is gradually increased in such a state in S5, the load of the Z-axis feed motor 9 gradually increases during the process. Then, if the load torque at the target advanced end position P is greater than or equal to the first value B (upper limit B), the jig 5 is slightly moved away from the center 15 in S8, and then, it is determined if the load of the Z-axis feed motor 9 has become less than or equal to the second value A (lower limit A) in S9.

In S9, if the control unit C determines that the load of the Z-axis feed motor 9 is less than or equal to the second value A at the target advanced end of the center 15, an advanced end signal of the center 15 is checked for confirmation in S10, and then, the position information on the jig 15 is captured in S11. In FIG. 3, symbol Pt indicates the position when the load of the Z-axis feed motor 9 has reached the threshold TL, and P-Pt is about 0 to 50 μm. It should be noted that the position information on the jig 5 is captured by converting a signal from the pulse encoder 10 into position information via the servo processor 21 and writing such position information into memory in the main processor 18. It should be noted when an advanced end signal of the center 15 cannot be confirmed in S10, it is determined that an abnormality has occurred in the apparatus. Thus, the measurement is interrupted.

As described above, a position detecting method performed with the position measuring apparatus of the present invention includes monitoring a sudden change (drop) in the load torque from a high level. With this method, it is possible to detect a sudden change (drop) in the torque with smaller errors (with a smaller response delay b) than when a slow change (increase) in the load is detected as in the conventional load monitoring scheme shown by the load curve A in FIG. 3. In addition, as the load torque value used for detection is above the detectable load torque (threshold) TL from the beginning, the response delay b can be significantly smaller than the conventional response delay a, as shown by the response delay b of the load curve B in FIG. 3. Further, in the conventional load monitoring scheme, the measurement direction of the stylus (which corresponds to the jig 5) and the direction in which the inertial mass of the stylus acts are the same. This is the main cause for the occurrence of the large response delay a as shown in the load curve A in FIG. 3. In contrast, in the present invention, the measurement direction and the direction in which the inertial mass of the jig 5 acts as a reaction force are opposite. Due to such reason also, the response delay b can be small. Further, it is also possible to eliminate feed errors (backlash) due to the Z-axis ball screw 8 even when such a ball screw is used. Accordingly, the position measuring apparatus in accordance with the present invention can measure a position with high accuracy.

It should be noted that in the above description, the hydraulic pressure on the center 15 is gradually increased in S5. However, it is also possible to set the hydraulic pressure constant to increase the work efficiency. When the hydraulic pressure is gradually increased, it is preferable to further provide a limit pressure at a level above the first value B (upper limit B) to avoid destruction of the equipment. In such a case, the hydraulic pressure can be increased within the range of up to the preset limit pressure. In addition, in such a case, when the limit pressure is exceeded, it is determined that an abnormality has occurred in the control of the inverter 19. Thus, the process is terminated regarding the step as abnormal.

In addition, if the answer to S7 is NO, that is, if the load of the motor 9 is not greater than or equal to the first value B (upper limit B), the jig 5 and the center 15 are in the abutment state at that point in time, and the load of the motor 9 is greater than the second value A (lower limit A). Thus, the step returns from S9 to S5 to continue increasing the hydraulic pressure on the center 15.

As described above, in the position measuring apparatus using the load-monitoring scheme, the response delay b can be made small as along as the measurement direction of the jig 5 and the direction in which the inertial mass of the jig 5 acts as a reaction force are opposite. Therefore, in the apparatus shown in FIG. 1, it is possible to measure a position with a small response delay b by providing a spring-mounted retractable function to the jig 5 that is attached to a main spindle (in the case of a NC machine tool) or a turret (in the case of a NC lathe) while fixing the center 15 at a predetermined position (e.g., at the advanced end or the retracted end). In such a case, it is possible to obtain similar effects by pressing (advancing) the jig 5 toward the fixed center 15 in advance, up to a position where a spring force acts during measurement, and thereafter gradually retracting the jig 5 to find a reduction in the load at a moment when the spring force does not act any more. For such a configuration, a blade spring, for example, is attached to the tip end of the jig 5 such that the blade spring abuts the center 15, though not shown.

Figure 4:
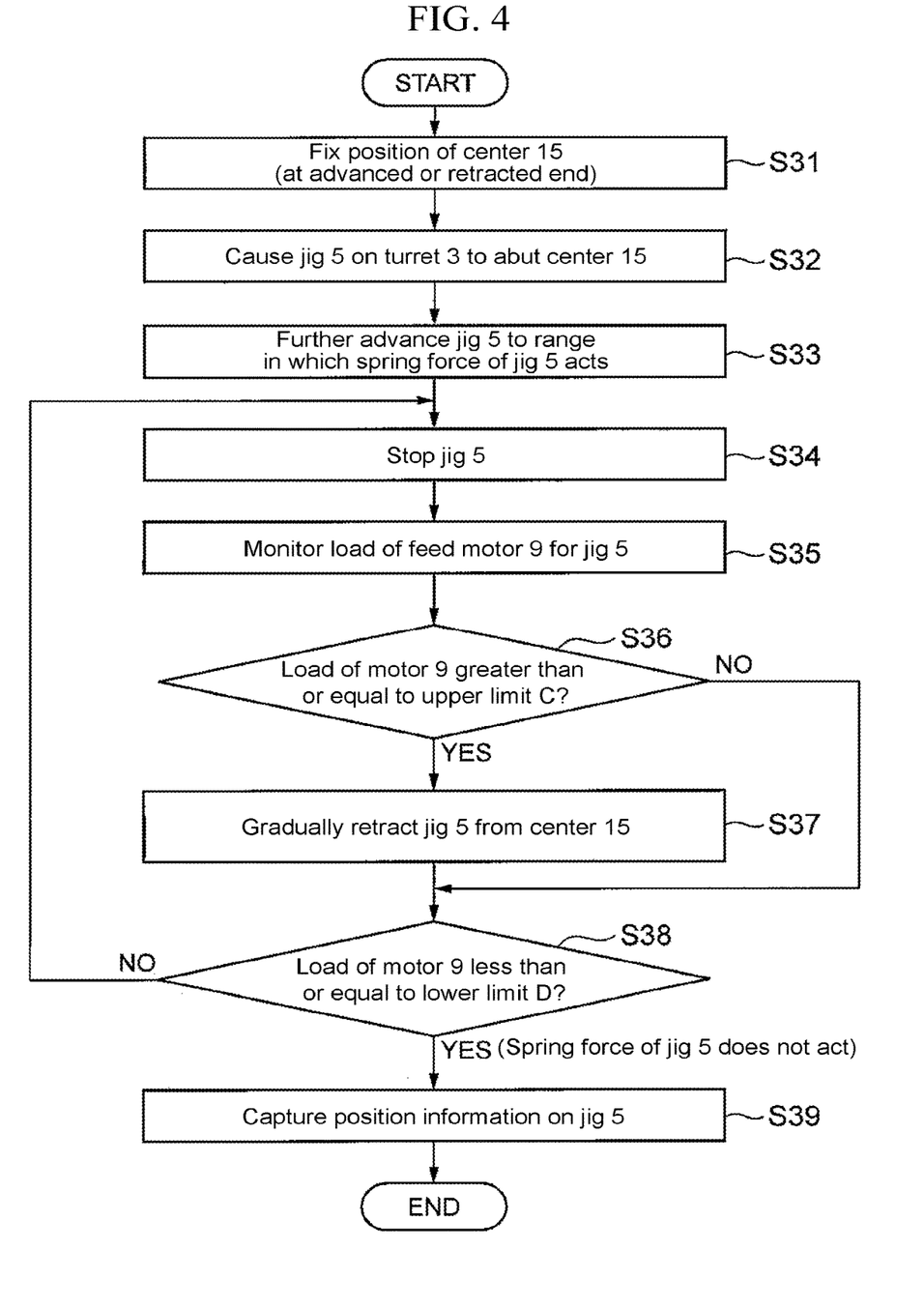
FIG. 4 is a flowchart illustrating the operation of another embodiment of the position measuring apparatus in accordance with the present invention.

Hereinafter, such an example will be described with reference to a flowchart in FIG. 4. In the apparatus of this embodiment, the jig 5 has a spring means (blade spring) attached to its tip end as described above, though not shown in FIG. 1, and the jig 5 is moved toward the fixed center 15 such that the jig 5 is pressed against the center 15 with the blade spring abutting the center 15, so that the blade spring gradually warps.

To perform measurement, the center 15 is first fixed at an appropriate position by operating the hydraulic cylinder 12 in S31. The fixed position may be any position, for example, the advanced end, the retracted end, or any given position therebetween.

In S32, the Z-axis feed motor 9 is driven to cause the jig 5 on the turret 3 to abut the center 15. Specifically, the blade spring attached to the tip end of the jig 5 first abuts the center 15. In such a state, the jig 5 is further advanced in S33 to a range in which the spring force of the jig 5 acts. In S34, the feed of the jig 5 is stopped at an appropriate position where the spring force acts. In S35, the load torque of the Z-axis feed motor 9 for the jig 5 in such a state is monitored. Herein, specifically, the load torque (the amount of current) of the Z-axis feed motor 9 is monitored with the main processor 18 via the ammeter 22.

In S36, it is determined if the load of the motor 9 is greater than or equal to a first value C (a value equivalent to the first value B that is the upper limit B). Herein, the first value C corresponds to the load when the spring force of the jig 5 acts, and is set at such a high level that the load monitoring means does not malfunction. A spring with such a spring constant is experimentally selected and used. If the answer to S36 is YES, that is, if the monitored load is greater than or equal to the first value C, the jig 5 is gradually retracted from the center 15 in S37. Then, in S38, it is determined if the load torque of the monitor 9 is less than or equal to a second value D (a value equivalent to the second value A that is the lower limit A). Herein, the second value D corresponds to the load when the spring force of the jig 5 does not act any more, that is, the jig 6 does not abut the center 15 any more because the jig 5 has retracted, and is a value when the monitored load is detected with the center 5 retracted.

In S38, if the load torque of the motor 9 is less than or equal to the second value D, the position information on the jig 5 is captured in S39. It should be noted that the position information is captured by, as described with reference to FIG. 2, converting a signal from the pulse encoder 10 into position information via the servo processor 21, and writing such position information into memory in the main processor 18.

The apparatus in the aforementioned embodiment is also configured to monitor a sudden change (drop) in the load torque from a high level. With such a configuration, it is possible to significantly reduce the response delay b in comparison with the response delay a in the conventional apparatuses as shown in FIG. 3. Accordingly, position measurement with high accuracy is possible.

DESCRIPTION OF SYMBOLS

A Load curve of the conventional position measuring apparatus

B Load curve of the position measuring apparatus in accordance with the present invention
1 Sliding table
2 Toolpost
3 Turret
4 Main spindle table
5 Pressing jig for detecting center (measurement target)
6 X-axis feed motor
7 X-axis ball screw
8 Z-axis ball screw
9 Z-axis feed motor
10 Pulse encoder
11 Tailstock
12 Hydraulic cylinder (for advancing and retracting the center)
13 Hydraulic switching valve
14 Hydraulic pump
15 Advanceable and retractable center (measurement target)
16 Chuck
17 NC control device
18 Main processor
19 Inverter
20 PLC (programmable controller)
21 Servo processor
22 Ammeter

What is claimed is:

1. A position measuring apparatus comprising at least:
an abutment unit that causes a position detecting jig fed by a feed motor to abut a measurement target;
a detecting unit that detects a position of the measurement target by reading a fluctuation in a load torque of the feed motor;
a load increasing unit capable of increasing the load torque of the feed motor to a predetermined first value in a state in which the position detecting jig abuts the measurement target, the first value being above a threshold that is detectable by the apparatus;
a canceling unit that, when the load torque of the feed motor has become greater than or equal to the first value, cancels the abutment state between the measurement target and the position detecting jig to thereby cause a sudden drop in the load torque of the feed motor;
a monitoring unit that monitors if the dropped value of the load torque has become less than a predetermined second value, the second value being less than the first value and greater than the threshold; and
a capturing unit that captures position information on the position detecting jig as the position of the measurement target when the monitoring unit detects that the load torque of the feed motor has become less than the second value.

2. The position measuring apparatus according to claim 1, wherein
the measurement target is an advanceable and retractable measurement target,
the position information to be measured is an advanced end position of the measurement target, and
the load increasing unit includes
a balancing unit that keeps a balance between pressures on the measurement target and the position detecting jig that are opposite each other in the abutment state,
a first movement unit that slightly moves the measurement target and the position detecting jig in a balanced state in a direction to retract the measurement target, and
a pressure applying unit that applies pressure to a side of the measurement target toward the position detecting jig after both the measurement target and the position detecting jig have been slightly moved.

3. The position measuring apparatus according to claim 2, wherein
a push-back amount of the first movement unit that slightly moves the measurement target and the position detecting jig in the balanced state in the direction to retract the measurement target is 0 to −100 μm from an initial reference position, and
a distance between the measurement target and the position detecting jig that is secured to cancel the abutment state therebetween when the load torque of the feed motor has become greater than or equal to the first value is less than or equal to 50 μm, preferably, less than or equal to 10 μm.

4. The position measuring apparatus according to claim 1, wherein
the measurement target is a fixed measurement target,
the position information to be measured is a fixed position of the measurement target,
the position detecting jig further includes a spring member, and
the load increasing unit includes a second movement unit that moves the position detecting jig toward the fixed measurement target until the spring member acts as a spring.

* * * * *